United States Patent [19]

Burkert

[11] 4,383,762
[45] May 17, 1983

[54] TWO-BEAM INTERFEROMETER FOR FOURIER SPECTROSCOPY WITH RIGID PENDULUM

[75] Inventor: Peter Burkert, Munich, Fed. Rep. of Germany

[73] Assignee: Kayser-Threde GmbH, Munich, Fed. Rep. of Germany

[21] Appl. No.: 233,235

[22] Filed: Feb. 10, 1981

[30] Foreign Application Priority Data

Feb. 14, 1980 [DE] Fed. Rep. of Germany ....... 3005520

[51] Int. Cl.³ .............................................. G01B 9/02
[52] U.S. Cl. .................................................. 356/346
[58] Field of Search .............................. 356/345–348, 356/359, 360

[56] References Cited

FOREIGN PATENT DOCUMENTS 1010277 11/1965 United Kingdom .

OTHER PUBLICATIONS

Vanesse et al., "Report of 1st International Conference on Fourier Spectroscopy in 1970", AF Cambridge Research Labs., L. G. Hanscom Field, Bedford, Mass., USA. pp. 43–53.
Dyson, J., "Interferometry as a Measuring Tool" Pub. by The Machinery Pub. Co., 1970, p. 92.
Schindler, R. A., "An Interference Spectrometer for the Remote Sensing of Pollutants", Journal Spacecraft, vol. 9, Issue No. 5, p. 714.
Peck, E. R., "A New Principle in Interferometry Design", JOSA, vol. 38, No. 1, Jan. 1948, p. 66.

Primary Examiner—Bruce Y. Arnold
Attorney, Agent, or Firm—Sughrue, Mion, Zinn, Macpeak and Seas

[57] ABSTRACT

A two-beam interferometer for Fourier spectroscopy includes a rigid pendulum structure mounting at least one of the movable retroreflectors in a fully compensated optical system immune to tilt and lateral movement distortions. The swing of the rotatably journaled pendulum accurately confines the retroreflector(s) to movement in a single plane during scanning and, due to the low heat generated in the pendulum bearings, the simple and compact structure is well adapted to be housed in a cryostat aboard a spacecraft.

9 Claims, 6 Drawing Figures

TWO-BEAM INTERFEROMETER FOR FOURIER SPECTROSCOPY WITH RIGID PENDULUM

BACKGROUND OF THE INVENTION

This invention concerns a two-beam interferometer for Fourier spectroscopy, particularly for the measuring of radiation in cryostats aboard spacecraft. Its basic components comprise a beam splitter arranged in the path of the source beam, possibly a compensation plate, a first reflector, a second reflector and a detector system for recording the measured radiation.

As is known, two-beam interferometers were traditionally used in the form of Michelson interferometers for exact linear measurements wherein the unknown mechanical lift of the moving reflector is measured with the help of the known, quasimonochromatic measured radiation in the interferometer. The measuring task, which is inverse for this purpose, is the determination of the unknown spectrum of the source radiation fed into the interferometer on the basis of the exactly known movement profile of the moving reflector (Fourier spectroscopy). Fourier spectroscopy as a means for the spectroscopic analysis of unknown radiation was only introduced into metrology at the beginning of the sixties when developments in electronic data processing made available computers for the first time which could numerically evaluate interferograms. For Fourier spectroscopy, the radiation to be investigated is fed into a two-beam interferometer, for example a Michelson interferometer, where it is split into two bundles by means of a semi-penetrable beam splitter. After being reflected back by two mirrors the beams are superimposed and brought to interference. One of the two mirrors is moved in the direction of the radiation by a suitable mechanical drive, whereby the intensity fluctuation of the central spot in the interference pattern is recorded as a function of the position of the movable mirror. The interferogram obtained in this manner is the Fourier transformation of the energy spectrum, i.e. the radiation intensity as a function of the wavelength of the interfering radiation. Fourier spectroscopy is used for the registration of emission spectra as well as absorption spectra. Owing to the improved measuring conditions outside the earth atmosphere, Michelson interferometers have also been carried aboard spacecraft for the measuring of radiation in extraterrestrial areas. From a metrological point of view, this is done in such a way that the detector signals are buffered, if necessary, and are then evaluated in a computer.

Different methods are available for taking interferograms. According to the scanning technique it is sufficient to measure the interferogram only at certain, exactly defined mirror positions. The adjustment and selection of these positions depends on the measurement goal. Besides the classic step-by-step mirror advance, there is also a method wherein the movable mirror is continuously shifted at a constant speed. This method is useful on quickly moving measuring platforms or for measuring short life span radiations.

Typical scanning periods of modern, continuously scanning, interferometers are in the magnitude of one second to about a few minutes per interferogram. In practice, as constant an advance speed as possible is to be obtained with a continuous advance. Speed fluctuations within the range of a few percent are tolerable if vibrations transferred from the drive motor to the moving mirror are suppressed as much as possible. The linear advance of the mirror is normally effected by a spindle or the like riding along one or more guide rails.

Any irregularity in the mirror guide or path, for example a tilting of the mirror plane in the case of a Michelson interferometer, leads to distortions in the interferogram. Owing to the extreme accuracy requirements for the movable mirror guide, high-quality retroreflectors have been used instead of planar mirrors, which retroreflect the incident radiation back in the same direction from which it arrived.

Two-beam interferometers for Fourier spectroscopy which are equipped with movable retroreflectors are known in numerous configurations. Reference is made, for example, to the report of the 1st International Conference on Fourier Spectroscopy in 1970 by G. A. Vanasse et al, published by Airforce Cambridge Research Laboratories, L. G. Hanscom Field, Bedford, Mass., U.S.A., pages 43 to 53.

Triple reflectors, cubic corners designed as full prisms, and cat's eyes in reflector or lens designs as well as pentareflectors and pentaprisms have been used as retroreflectors. With a simple replacement of the planar mirrors in a classic Michelson interferometer by such retroreflectors, the linear accuracy of the reflector movement is still required since any lateral traversal of the retroreflector during its movement distorts the interferogram. To counter this problem optical systems have been proposed which are immune to tilting as well as lateral traversal of the reflector. These optical systems are characterized by the combination of a movable retroreflector with a stationary mirror. An example is the "Terrien" system which combines a cubic corner with a stationary reflector (cf., for example, J. Dyson "Interferometry as a Measuring Tool", published by The Machinery Publishing Company 1970, page 92) or the combination of a cat's eye with a stationary reflector (cf., for example, the paper by R. A. Schindler "An Interference Spectrometer for the Remote Sensing of Pollutants" in the Journal Spacecraft, Volume 9, Issue No. 5, page 714).

The present two-beam interferometer in the U.S.A. for measuring atmospheric transmissions, the Atmos experiment for a future spacelab mission, has two cat's eyes as fully compensating retroreflectors with linear guides which are mechanically driven. This drive is considerably complex making the unit relatively heavy and large. Such units may be tolerated for normal measurements in an uncooled environment with a large spacecraft such as a spacelab, but with smaller spacecraft and/or measuring in low temperature ranges in cryostats the most important requirements to be met are low weight and small dimensions as well as extremely low heat generation. High complexity for low temperature measurements in cryostats is necessary for very weak radiations to prevent the inherent radiation of the measuring instrument from blanketing the source radiation. To minimize the refrigerant consumption of the cryostat in long term spacecraft experiments the heat generation in the cryostatic system itself is minimized. Frictional losses in sliding guides, spindle guides and similar mechanical guides of fast moving parts must, therefore, be minimized in the cryoenvironment. This also applies, of course, to the guides of retroreflectors of fast scanning interferometers as required for radiation measurements aboard spacecraft.

SUMMARY OF THE INVENTION

It is therefore an object of the invention to provide a two-beam interferometer for Fourier spectroscopy, particularly for the measurement of radiation in cryostats aboard spacecraft, where the moving reflector(s) is guided along its optical path in as uniform a manner as possible with minimal frictional heat development. According to the invention the first reflector is a stationary mirror and the second reflector is a moving retroreflector, and the overall optical system is rendered immune to tilting and lateral traversal through the use of a rigid pendulum.

Surprisingly, the system error occurring with the pendulum movement of the retroreflector in comparison with its uniform linear movement is negligibly low with regard to changes in speed. Thus, the optical advance speed in the variable interferometer arm deviates only slightly from the desired uniform speed. This deviation is dependent on the curvature along which the retroreflector is guided. The inherent deviation between the actual and ideal advance speeds caused by this curvature is smaller in practice than the differences in speed which are normally obtained with a linear advance of the reflector system along straight guides. A slightly curved guide-line path for the retroreflector is thus functionally equivalent for Fourier spectroscopy to a linear guide-line when suitable retroreflector systems are used.

It has been proposed in the literature (cf. the article "A New Principle in Interferometer Design" by E. R. Peck in the Journal of the Optical Society of America, Volume 38, Issue 1, January 1948) to guide a retroreflector formed of a pentareflector, a triple reflector, or a cubic cornered full prism by a rotating arm in a special two-beam interferometer for angle determinations by measuring length. This suggestion has not led experts in the art to propose the movement mode proposed herein in the construction of two-beam interferometers for Fourier spectroscopy. On the contrary, they are still directing all efforts, as shown in the Atmos experiment, to guide the moving retroreflector(s) in a straight line.

With the interferometer proposed by Peck, a traversing of the reflector on its circular path necessarily develops which distorts the interference pattern. This distortion may be tolerable when measuring length with quasi-monochromatic light, but in the case of Fourier interferometry, the traversing of the retroreflector would lead to distortions in the central spot of the interference pattern so that the spectroscopic evaluation of a measured radiation with a broader band is practically no longer possible. It was not recognized by Peck that a rigid pendulum suspension would offer a favorable possibility for the advance of the retroreflectors in connection with Fourier spectrometers.

The solution according to this invention, i.e. guiding the moving retroreflector(s) on a rigid pendulum arm and thus consciously accepting a distinct deviation from linear movement, does not produce any advantages for Fourier spectroscopy per se; the advantages of the new interferometer, instead, result from the favorable pendulum support and low bearing friction which enhances field measurements and enables cryostatic usage for fast scanning measurements of high resolution aboard spacecraft.

The friction in the pendulum bearing can be minimized by using ball bearings or magnetic bearings such that, for example, a heat development of only about 10 mW occurs during operation with an optical advance speed of 10 cm/s. In contrast, the heat development is higher by a factor of 20 to 100 with a drive using conventional linear guides.

In accordance with a further development of the invention, the two-beam interferometer can be designed such that the first reflector is also a moving retroreflector of an optical system fully compensated against tilting as well as traversing, for example along the lines of a "Terrien" system, said retroreflector being fastened to a rigid pendulum together with the first retroreflector. The rigid pendulum is expediently designed as a two-armed pendulum whose arms are perpendicular to each other.

When the retroreflectors of such a double-pendulum interferometer are fastened to the two pendulum arms at the same distance from the pendulum bearing, the stationary mirrors of the compensating system can even be eliminated since the traversing of the two retroreflectors is exactly the same in each movement phase and no difficulties arise as to the spectroscopic evaluation of the interferograms thus obtained.

With a precise pendulum support which restricts the pendulum structure to oscillate exactly in one plane with the retroreflectors, the fully compensating optical systems can also be replaced by less expensive partially compensating optical systems which consist of a combination of a pentareflector or pentaprism with a stationary retroreflecting planar mirror.

The retroreflectors may also be arranged in another geometric configuration on a rigid pendulum structure such that a spectroscopically evaluable interference pattern is obtained by the detector system, if necessary with the aid of further deflecting reflectors.

DETAILED DESCRIPTION OF THE PREFERRED EMBODIMENT

Figure 1:
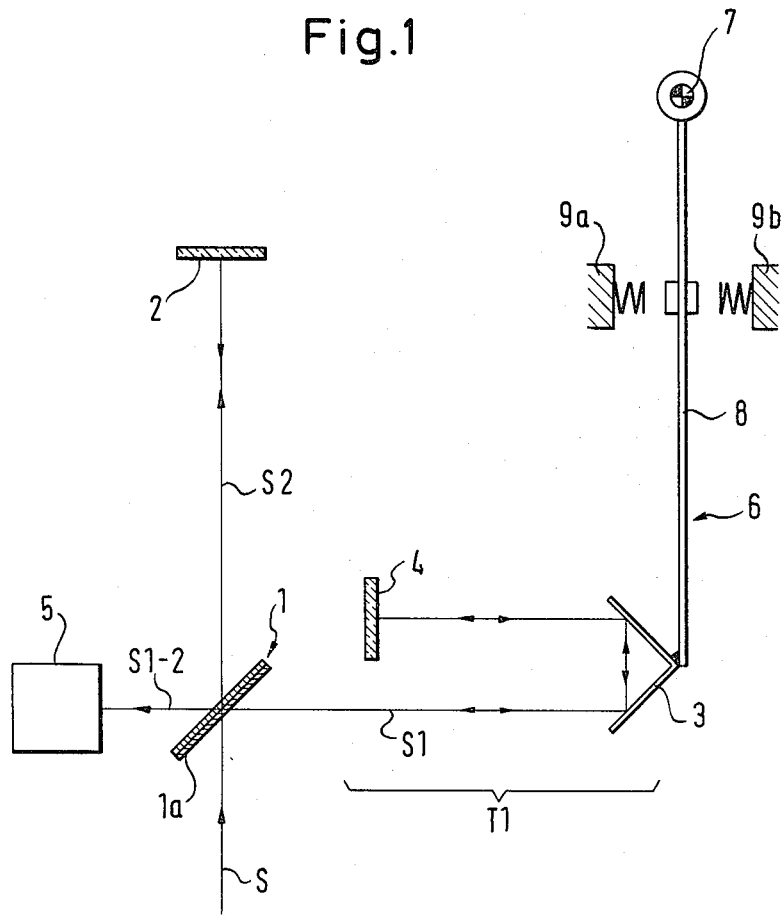
FIG. 1 shows a schematic view of a two-beam interferometer according to the invention using a one armed pendulum at the end of which the retroreflector of a fully compensating optical system is fastened.

Referring to FIG. 1, the incoming radiation S to be measured is divided by beam splitter 1 with compensation plate 1a into two partial radiations S1 and S2. The partial radiation S2 is reflected back by stationary mirror 2 to the beam splitter 1, and there reflected to detector 5. The partial radiation S1 strikes the retroreflector 3 and exits it in a laterally offset, parallel path. This partial radiation is reflected back by stationary mirror 4 of the fully compensating optical system T1 and exits at the original inlet point to reach detector 5 through beam splitter 1 in interference with the first partial radiation S2, and as radiation S1-2. The partial radiations which, after reflection or transmission, return again into the radiation S at the beam splitter 1 are lost for measurement purposes.

The retroreflector 3 is fastened to the end of rigid arm 8 of pendulum 6 which can swing around bearing 7 within the tolerance limits afforded by drive magnets 9a, 9b. In practice, the movement of pendulum 6 is controlled such that path lengths of approximately 1 cm can be covered with the retroreflector 3 on the basis of a given length of the pendulum arm of, for example, 20 cm and a deflection of ±1.5°.

The beam splitter 1 is built up in the usual sandwich construction with the compensation plate 1a. The magnets 9a, 9b can be replaced by / or combined with springs as shown in FIG. 1 which act on the pendulum arm 8 at the reversing points of the pendulum movement.

Figure 2:
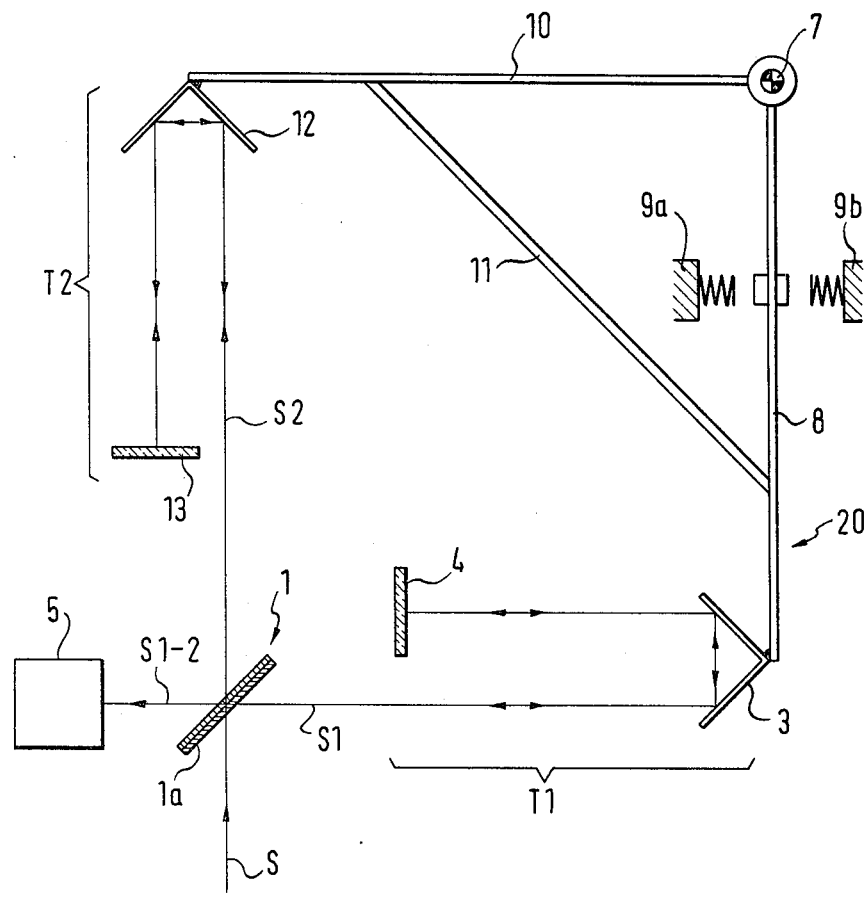
FIG. 2 shows a further development of the two-beam interferometer according to FIG. 1 wherein two retroreflectors of two fully compensating optical systems are fastened to the two arms of a double pendulum.

A further development of the two-beam interferometer of FIG. 1 as a double pendulum interferometer is shown in FIG. 2, wherein two retroreflectors 3, 12 of two fully compensating optical systems T1, T2 are fastened to two arms 8, 10 of a double pendulum 20. Since the pendulum guidance is technically very simple, it is also advantageous to replace the stationary mirror 2 of FIG. 1 by an analogous optical system which is immune to tilting as well as traversing movement and whose retroreflector 12 is fastened to a rigid arm 10 of the pendulum structure 20. The two rigid pendulum arms 8, 10 are fastened vertically to each other at the bearing 7 and are stiffened by support arm 11.

This double pendulum interferometer can be swung around bearing 7 in order to produce an optical difference in the path lengths. Thus, the optical path of the partial radiation S1 may be shortened by swinging clockwise while the optical path of the partial radiation S2 is simultaneously lengthened, and vice versa. In this fashion, the optical swing length is considerably increased without having to increase the length of the pendulum arms and/or the mechanical movement amplitude. This results in favorable unit dimensions for the double pendulum interferometer.

The measured radiation S is split up into the partial radiations S1 and S2 by the beam splitter 1 in a manner similar to FIG. 1, both of which are reflected back onto themselves after passing through the fully compensating optical system T1 or T2 and reach interference with each other after having passed again through beam splitter 1. The interfering partial radiation S1-2 is thereafter led to the detector 5 for the spectroscopic evaluation of the interference pattern.

With a corresponding dimensioning of the beam splitter 1 or a sufficiently small scanning movement of the double pendulum, the stationary mirrors 4 or 13 can be eliminated in the optical systems T1 or T2 and only the retroreflectors 3, 12 provided if, at the same time, care is taken that they are arranged at the same distance from the pendulum bearing 7. With such a symmetrical structure, the traversing of both retroreflectors during the advance movement is optically exactly offset.

The following dimensions are suitable for the design of a symmetrical double pendulum interferometer according to FIG. 2: Length of the pendulum arms 8, 10 from the bearing 7 to the fastening point of the retroreflectors 3, 12=20 cm. The angular amplitude covered by the double pendulum =3.7°. This results in an optical path difference of 10 cm. The systematic relative variation of the optical advance speed is kept below $10^{-3}$ under these circumstances owing to the circular path of the two reflector movements.

Figure 3:
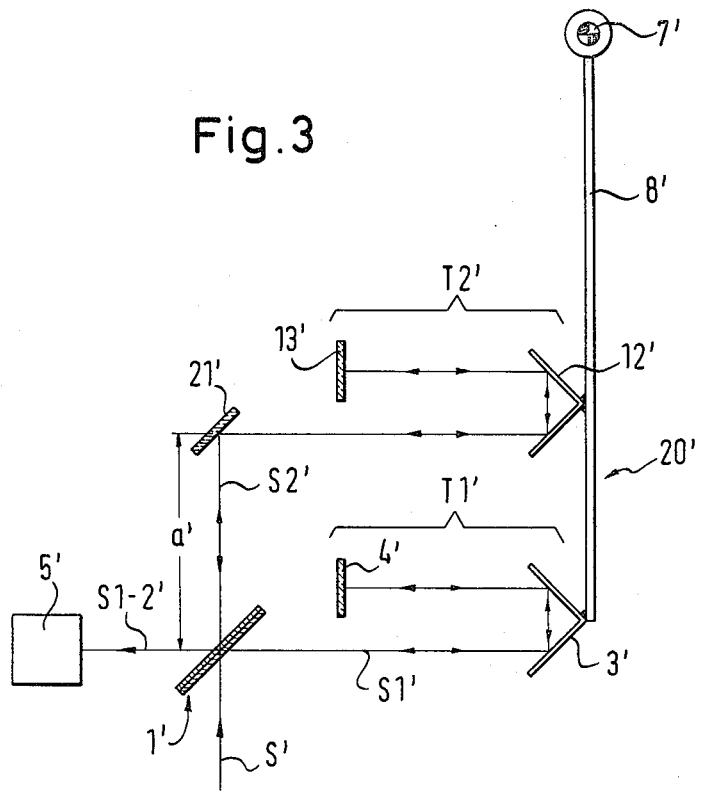
FIG. 3 shows a schematic representation of an alternative of the double pendulum interferometer according to FIG. 2 wherein the two retroreflectors are fastened to the same rigid pendulum arm.
Figure 4:
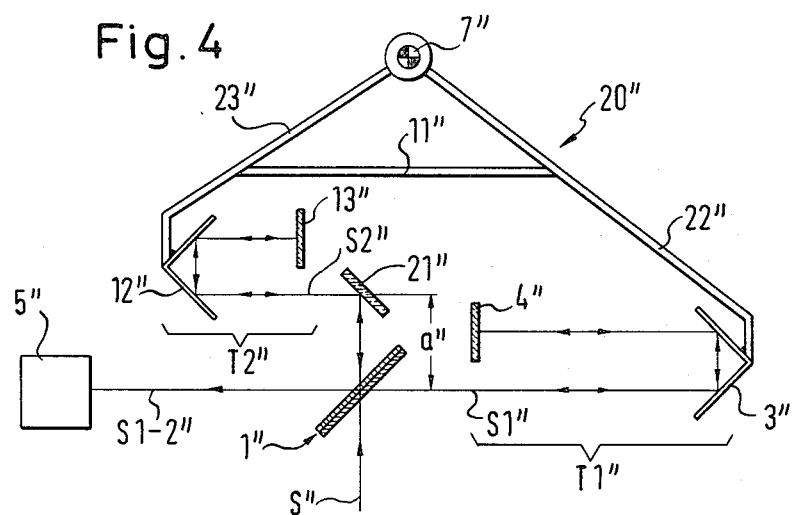
FIG. 4 shows a schematic representation of a further alternative of the double pendulum interferometer according to FIG. 2 wherein the two retroreflectors are fastened to the same rigid pendulum structure opposite each other but staggered.

Two additional embodiments for double pendulum interferometers having as small dimensions as possible are represented in FIGS. 3 and 4, wherein corresponding reference symbols for the same components are given with a ' in FIG. 3 and with a " in FIG. 4. In FIG. 3 the two retroreflectors 3' or 12' are fastened at a distance a' from each other to a single rigid pendulum arm 8' of the pendulum structure 20' and form the two fully compensating optical systems T1' or T2' together with the stationary mirrors 4' or 13'; the interferometer structure shown in FIG. 4 has more similarity with the one represented in FIG. 2.

In FIG. 3 the partial radiation S2' is reflected in the retroreflector 12' arranged above the retroreflector 3' at a distance a' by means of a deflecting mirror 21' and, after being returned by stationary mirror 13', it follows the same path back to the beam splitter 1' and from there to the detector 5', whereby the interference radiation S1-2" occurs by means of the interference of the reflected partial radiations S1' and S2'.

After the given explanation of the course of the radiation and the mode of operation of the Michelson interferometer, the operation of the double pendulum interferometer according to FIG. 4 is also easily understandable. The source radiation S" is split into two partial radiations S1" and S2" by beam splitter 1". Radiation S1" returns from the retroreflector 3" and the stationary mirror 4" over the same path. The partial radiation S2", after having passed through the beam splitter 1", is deflected by mirror 21" to retroreflector 12" and stationary mirror 13", and returns over the same path to beam splitter 1" and into interference with the reflected partial radiation S1" to reach detector 5" as interference radiation S1-2". A space saving double pendulum configuration 20" is created owing to the arrangement of the optical elements; the two arms 22" and 23" connected by supporting arm 11" are not perpendicular to each other but meet at bearing 7" at an obtuse angle.

Figure 5:
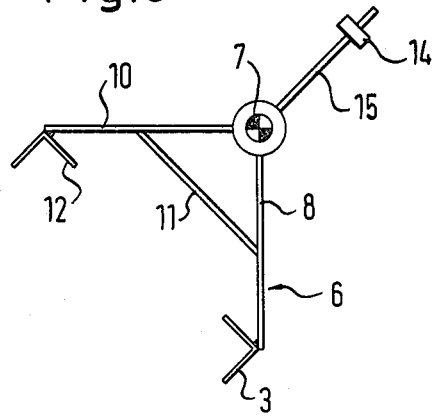
FIG. 5 shows a schematic view of a double pendulum interferometer according to FIG. 2 with a balance piece.

To sufficiently reduce the repelling moment of the physical pendulum produced by the force of gravity, the center of gravity of the pendulum must be brought sufficiently close to the center of rotation by means of balancing. In general, a balancing accuracy with a center of gravity position of about 1 mm is sufficient to limit the change in speed caused by the force of gravity to a few percent. The exact values depend on the length of the pendulum, movement amplitude, i.e. the spectral resolution, and the scanning period. FIG. 5 shows a schematic representation of a double pendulum interferometer according to FIG. 2 equipped with a balancing piece 14 and an additional arm 15.

When the pendulum guide is mounted such that the plane of movement is horizontal, the repelling moment due to the force of gravity is eliminated. In general, an alignment with an average level of accuracy is sufficient to limit the change in speed to a few percent with this arrangement. The frictional heat can be minimized with the use of suitable ball bearings, even with fast scanning.

Figure 6:
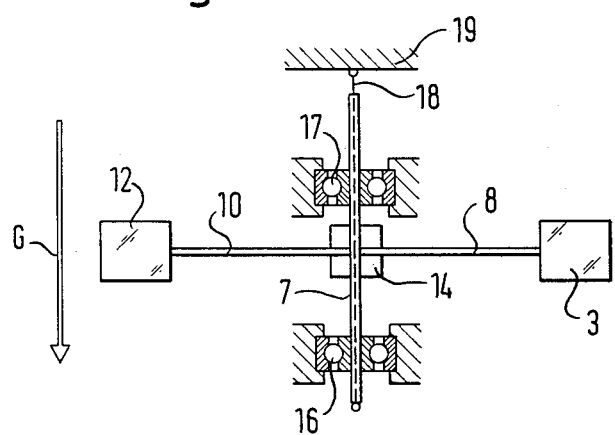
FIG. 6 shows a schematic view of a double pendulum interferometer according to FIG. 2 wherein the pendulum axis runs in the direction of a gravitational field.

A practical exemplified embodiment for such an arrangement is represented schematically in FIG. 6, wherein the pendulum axis or bearing 7 is vertically suspended from thread 18 on support 19. The axis 7 carries the arms 8, 10 of a double pendulum interferometer according to FIG. 5; the additional arm 15 which carries the balancing piece 14 is not visible. The retroreflectors 3, 12 are arranged at the same distance from the pendulum axis 7. Ball bearings 16, 17 implement the smooth running of the interferometer.

The two-beam interferometer according to the invention can be implemented with additional one-arm or multi-arm rigid pendulum structures which are not shown in the drawing but which accomplish the task of the invention in the same manner.

For the use of the interferometer for radiation measuring aboard spacecraft, the movement characteristic of the freely running advance is particularly favorable due to the weightlessness. The requirement of driving energy is extremely low for the pendulum bearing which runs smoothly in the balanced state but particularly also in the state of weightlessness which is especially favorable for long-term measuring with a limited energy supply in the spacecraft. The unit requires little space owing to the compact structure of the double pendulum interferometer.

If space flight experiments for the measuring of very low energy radiation should additionally be performed in a cryogenic environment, the pendulum or double pendulum interferometer according to the invention represents the presently most simple possibility for these extreme requirements without operating a mechanical passage through the cryostat wall of fast scanning two-beam interferometers with a sufficiently low heat load.

Finally, the unit is comparatively immune to disadjustment owing to its simple design. This represents an essential advantage for the use of the interferometer in the field as well as in the laboratory as a routine unit.

The pendulum drives have not been illustrated other than by the schematic representation of the magnets 9a, 9b in FIGS. 1 and 2 as such drives can take any one of a number of forms well known in the art, which form no part of the present invention.

What is claimed is:

1. A two-beam interferometer for Fourier spectroscopy, particularly for measuring radiation in cryostats aboard spacecraft, including a beam splitter arranged in the path of a source beam, a first reflector, a second movable retroreflector, and a detector system for recording the measured radiation, characterized by:
    (a) rigid pendulum means rotatably mounted to swing in a single plane, and
    (b) means mounting the movable retroreflector to the pendulum means spaced from the center of rotation of the pendulum means as part of a fully compensated optical system which is immune to tilting and transverse movement distortions.

2. An interferometer according to claim 1, wherein the first reflector is a movable retroreflector, and wherein both retroreflectors are mounted to the pendulum means.

3. An interferometer according to claim 2, wherein both retroreflectors are individually mounted to separate and perpendicular arms of a rigid two-arm pendulum system.

4. An interferometer according to claim 3, wherein both retroreflectors are mounted on the pendulum arms at the same distance from the center of rotation of the pendulum means.

5. An interferometer according to claim 4, wherein the retroreflectors are triple reflectors, cubic cornered full prisms, or cat's eyes designed as reflectors or lenses.

6. An interferometer according to claim 2, wherein both retroreflectors are mounted to a single rigid pendulum arm, and a deflecting mirror (21") is provided to direct a radiation beam to the second retroreflector (12").

7. An interferometer according to claim 2, wherein both retroreflectors (3", 12") are individually mounted to separate arms of a rigid pendulum structure such that the retroreflectors are arranged facing the center plane which bisects the angle between the separate arms, but at different distances from the center of rotation of the pendulum means, and wherein a deflecting mirror (21") is provided to direct radiation to the second retroreflector (12").

8. An interferometer according to any one of claims 1 to 7, wherein the pendulum means has an auxiliary arm with a balance weight mounted thereon such that the center of gravity of the pendulum means coincides with the center of rotation of the pendulum means.

9. An interferometer according to claim 8, wherein the pendulum means axis of rotation is vertically oriented, is fastened to a support by a thread, and is journaled in ball bearings.

* * * * *